(12) United States Patent
Bovo et al.

(10) Patent No.: US 7,580,527 B2
(45) Date of Patent: Aug. 25, 2009

(54) COMMUNICATION MONITORING IN A MOBILE RADIO NETWORK

(75) Inventors: Antonio Bovo, Padua (IT); Michele Fioravanti, Noale (IT); Alessio Biasutto, Mestre (IT)

(73) Assignee: Tektronix, Inc., Beaverton, OR (US)

( * ) Notice: Subject to any disclaimer, the term of this patent is extended or adjusted under 35 U.S.C. 154(b) by 920 days.

(21) Appl. No.: 10/622,657

(22) Filed: Jul. 18, 2003

(65) Prior Publication Data

US 2004/0057392 A1 Mar. 25, 2004

(30) Foreign Application Priority Data

Jul. 19, 2002 (EP) .................................. 02016132

(51) Int. Cl.
*H04K 1/00* (2006.01)
(52) U.S. Cl. .................................................. 380/270
(58) Field of Classification Search ................. 380/270
See application file for complete search history.

(56) References Cited

U.S. PATENT DOCUMENTS

| | | | | |
|---|---|---|---|---|
| 4,920,567 A | * | 4/1990 | Malek | ......................... 380/33 |
| 6,959,346 B2 | * | 10/2005 | Low et al. | ...................... 710/50 |
| 2001/0047474 A1 | * | 11/2001 | Takagi et al. | ................. 713/151 |

OTHER PUBLICATIONS

Tektronix "Online 2001", p. 1-4, "Monitoring System NET-7", www.Tektronix.com.

Tektronix "Online 2001", pp. 1-16, "Managing Quality of Service, Security, Roaming Scenarios and Charging Functions in the New GPRS Packet-Switched Domain", www.Tektronix.com.

* cited by examiner

*Primary Examiner*—Kambiz Zand
*Assistant Examiner*—Jason K Gee
(74) *Attorney, Agent, or Firm*—Francis I. Gray; Matthew D. Rabdau; Michael J. Fogarty, III

(57) ABSTRACT

A system and method for communication monitoring in a mobile radio network uses a distributed system having one or more processing devices coupled to different links of a serving switching entity of the mobile radio network. The processing devices extract current deciphering parameters from data on the different links, including an additional deciphering parameter set obtained from a subscriber data base entity, from the data flow of the connection, and from each packet data unit as the sequence number of data packets (PDUs) making up the data. The current deciphering parameters are stored in a deciphering parameter providing device so they are available for other processing devices upon request, the deciphering parameter providing device being coupled to the processing device(s) by a communication link such as a LAN or WAN. The data on the different links, if ciphered, are deciphered by the processing device and combined with delayed unciphered portions of the data to form an ordered data flow as deciphered data. A deciphered data providing device, also coupled to the processing device(s) by the communication link, receives the deciphered data and provides it as an output for further processing. A mobile subscriber moving from one service area to another has the deciphering parameters established at set-up or renewed attach stored in the deciphering parameter providing device of one service switching entity which then may provide the deciphering parameters to all the processing devices querying them.

10 Claims, 2 Drawing Sheets

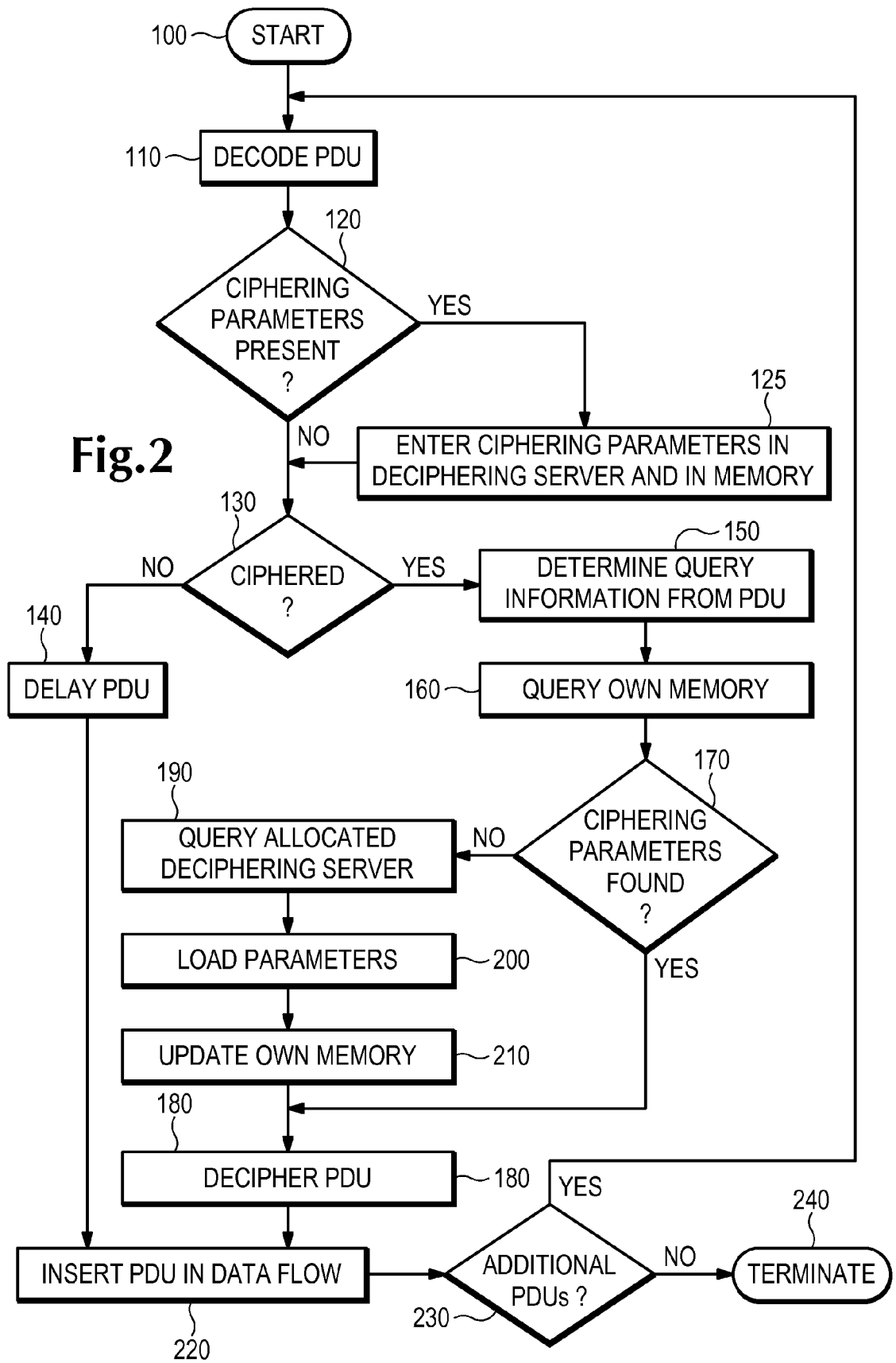

COMMUNICATION MONITORING IN A MOBILE RADIO NETWORK

BACKGROUND OF THE INVENTION

The present invention relates to monitoring of communications networks, and more particularly to communication monitoring in a mobile radio network.

In a mobile radio network data is transferred in the form of data packets or Packet Data Units (PDUs). The data transmitted includes both useful data and signaling data. Each mobile radio subscriber is allocated to a radio access entity that can exchange data with the subscriber via radio. The allocation may change with the movement of the subscriber. Each radio access entity is connected to a serving switching entity via a first link. Each serving switching entity exchanges data between plural radio access entities allocated to it or with a higher instance to which plural serving switching entities are allocated. Each serving switching entity is connected to a subscriber data base entity via a second link. The subscriber data base entity contains subscriber-oriented data of the subscriber allocated to it. The data exchanged between one radio access entity and its serving switching entity is ciphered data. First and second ciphering parameters are used for ciphering the first link. The first ciphering parameter is provided by the subscriber data base entity. The second ciphering parameter is recovered dynamically from the data exchange between such radio access entity and its serving switching entity.

Under a General Packet Radio Service (GPRS) standard the serving switching entity is a Serving GPRS Support Node (SGSN), the first link is a Gb interface, the second link is a Gr interface, the radio access entity is a Base Station Subsystem (BSS), and the subscriber data base entity is a Home Location Register (HLR).

Currently a stand-alone instrument, such as the Tektronix K1205 Protocol Tester manufactured by Tektronix Berlin GmbH, operates as a probe connected to a line, with deciphering taking place within a specific monitoring application of the instrument. All required Gb and Gr interfaces need to be connected directly to the instrument, which may provide up to sixteen (16) connections. No cooperation and especially no exchange of deciphering parameters with other instruments is possible. Any processing following deciphering, such as compiling statistics and call traces, is done directly within the instrument. However off-line processing, i.e., non-realtime processing, may be done on recorded files. Therefore, while the instrument may be used for monitoring the communication of selected links, generally it does not allow any real-time monitoring of an SGSN or of a complete mobile radio network.

Even if several instruments are used, they are not suited for cooperation with other instruments. If the instrument were expanded to a random number of connections, this only allows monitoring at fixed position, such as at an SGSN. If the data from individual instruments were collected, especially in a ciphered form for lack of ciphering parameters, and were forwarded to some central processing location, this no longer allows for realtime monitoring. Monitoring becomes virtually impossible when a mobile radio subscriber moves from the service area of a first SGSN into the service area of a second SGSN. In this case to get the correct deciphering parameters all the connections and also the inter-SGSN connections need to be monitored.

What is desired is an improved monitoring instrument that allows the monitoring of a complete mobile radio network or any portion thereof in realtime.

BRIEF SUMMARY OF THE INVENTION

Accordingly the present invention provides for communication monitoring in a mobile radio network by using a distributed monitoring system instead of a stand-alone instrument. One or more processing devices are coupled to different links of a serving switching entity of the mobile radio network. The processing devices extract current deciphering parameters from data on the different links, including an additional deciphering parameter set related also to the sequence number of data packets (PDUs) making up the data. The current deciphering parameters are stored in a deciphering parameter providing device so they are available for other processing devices upon request, the deciphering parameter providing device being coupled to the processing device(s) by a communication link such as a LAN or WAN. The data on the different links, if ciphered, are deciphered by the processing device and combined with delayed unciphered portions of the data to form an ordered data flow as deciphered data. A deciphered data providing device, also coupled to the processing device(s) by the communication link, receives the deciphered data and provides it as an output for further processing. A mobile subscriber moving from one service area to another has the deciphering parameters established at set-up or renewed attach stored in the deciphering parameter providing device of one service switching entity which then provides the deciphering parameters to all the processing devices requesting them or to other deciphering parameter providing devices in adjacent service areas for availability when the mobile subscriber moves into one of the adjacent service areas using another service switching entity.

The objects, advantages and other novel features of the present invention are apparent from the following detailed description when read in conjunction with the appended claims and the attached drawing.

BRIEF DESCRIPTION OF THE SEVERAL VIEWS OF THE DRAWING

FIG. 2 is a signal flow chart view for communication monitoring in a mobile radio network according to the present invention.

DETAILED DESCRIPTION OF THE INVENTION

Figure 1:
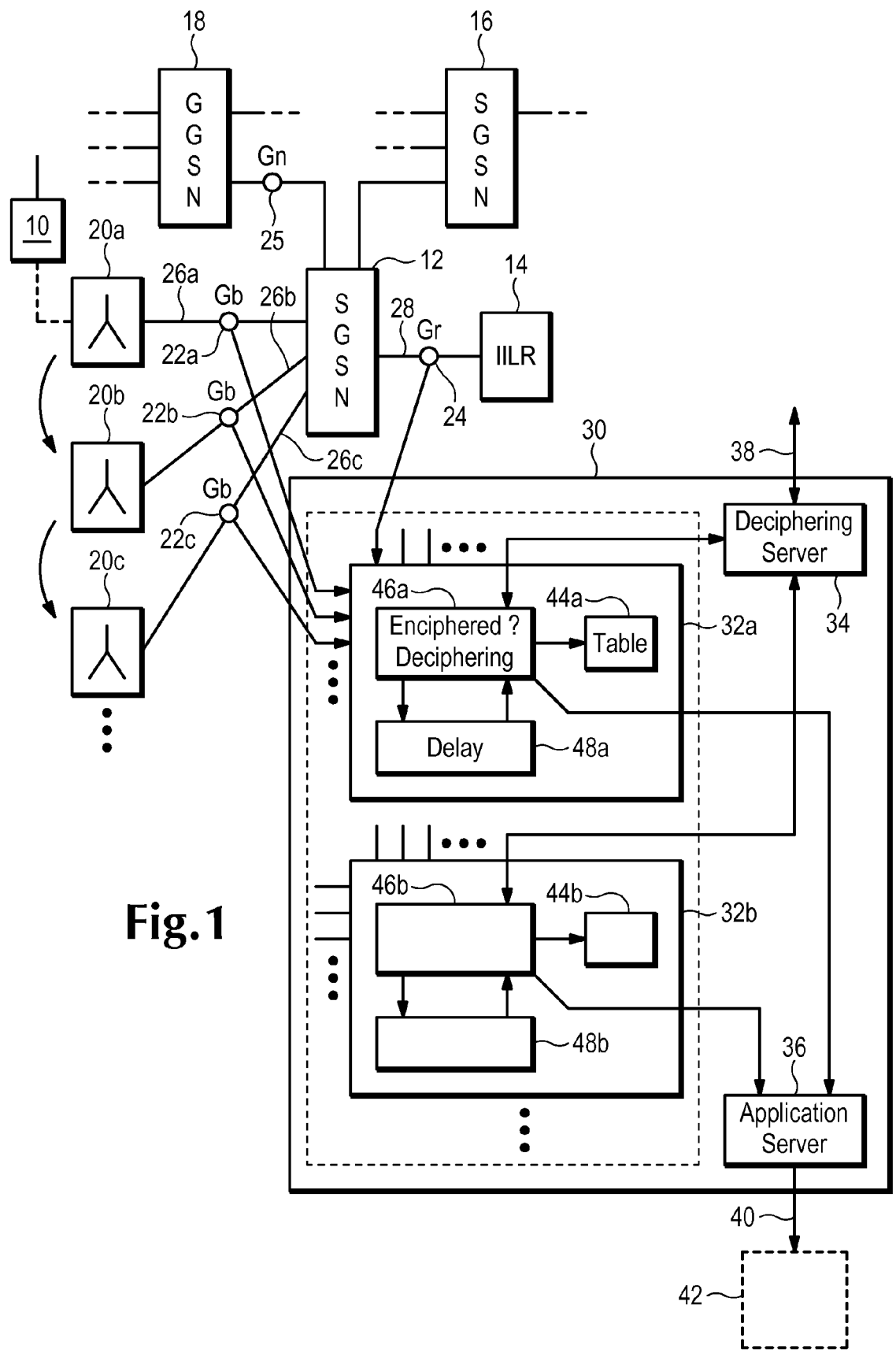
FIG. 1 is a block diagram view of a communication monitoring system connected to a mobile radio network according to the present invention.

For communication monitoring in a mobile radio network a distributed monitoring system is used. An intelligent distribution of functions allows a plurality of components to cooperate, which makes it possible to monitor a complete mobile radio network or any portion thereof in real time. A deciphering architecture provides a non-intrusive monitoring system that is able to manage the deciphering process automatically. This allows a protocol analysis or procedure trace to be performed on ciphered packets.

The following is a description of components to be located at an SGSN, which components also cooperate with corresponding components at other SGSNs via appropriate connections, such as a Local Area Network (LAN) or a Wide Area Network (WAN). Various other constellations may be used, depending on the application purpose, of which a few are described below. It is possible to have the processing devices of plural SGSNs cooperate with a deciphering parameter providing device and a deciphered data providing device. Likewise the processing devices of an SGSN may transfer their deciphering parameters or deciphered data not only to the deciphering parameter providing device allocated to the corresponding SGSN and to the deciphered data providing device, but also to a predeterminable number of neighboring SGSNs into whose service area a mobile radio subscriber may move when changing position.

The processing device is coupled to the deciphering parameter providing device and deciphered data providing device, preferably via LAN or WAN. Especially in GPRS applications the data on first links also is ciphered by means of a third ciphering parameter besides the first two. The first two sets of parameters, obtained from the subscriber data base entity and from the flow of data exchanged between the radio access entity and serving switching entity, are normally queried by the processing device to the deciphering parameter providing device. The third ciphering parameter is a set of parameters obtained directly from each data packet. The processing device determines the third ciphering and uses it for deciphering the data transferred on the first link. Each processing device includes a device for delaying the forwarding of selected data packets in such a manner that an ordered data flow of data packets is maintained at the output of the processing device, regardless of whether or not a data packet has been ciphered. A ciphered data flow thus enters the processing device and exits later in deciphered form while allowing the original order to be maintained. This is useful in view of the vast number of possible post-processing procedures and evaluations. Filter functions may be implemented in the processing device for application to the data flow of ciphered and deciphered data packets.

For real-time applications each processing device has a first memory, such as a cache, in which the deciphering parameters provided by the deciphering parameter providing device are stored. This avoids repeated queries for the current deciphering parameters to the deciphering parameter providing device for the same mobile radio subscriber. For particularly fast access times the memory is kept small, and the oldest entries are overwritten by the most recent entries.

Plural processing devices may cooperate in parallel with allocated deciphering parameter providing devices and allocated deciphered data providing devices, the number of the processing devices being chosen to cover all first and second links allocated to a serving switching entity. One example is plural processing devices, one deciphering parameter providing device and one deciphered data providing device cooperating for one serving switching entity. Subdividing the monitoring apparatus into units per serving switching entity allows a well-arranged and clear configuration, and thus a simple structure. The processing devices are located with the SGSNs, the deciphering parameter providing device is located centrally between plural SGSNs for which it is responsible, and the deciphered data providing device is located near devices which may be used for further processing of the deciphered data flow.

The processing device first checks whether or not an incoming data packet is ciphered. If the data packet is not ciphered, the data packet is time delayed for combination with as yet ciphered data packets once these have been deciphered to give an ordered data flow. If the data packet is ciphered, it is deciphered.

First and second ciphering parameters for a data packet are retrieved using an allocation parameter that is derived from the data packet. In GPRS systems this is the TLLI/RAI information. A ciphering/deciphering parameter may also be understood to be plural ciphering/deciphering parameters, so they are provided on a corresponding link. In GPRS the parameters Kc, IOV, OC, type of algorithm (see GSM 04.64 specification) used for ciphering are referred to as a ciphering parameter allocated to a certain mobile, i.e., as a set of parameters that is only changed after switch-on of a mobile handset or after a renewed attach or that may be dynamically upgraded with the traffic transferred by the mobile—OC parameter. Renewed attach means that a GPRS subscriber can always be on-line, since charging only is according to data volume. The set of parameters is transferred in an unciphered form or may be determined from the data flow, so the processing device determines the current and at least the first and second ciphering parameters from the data packets coming from the respectively connected first and/or second links, and forwards them to the allocated deciphering parameter providing device for storage as deciphering parameters. There they are available to other processing devices that thus are capable of deciphering data from mobile radio operators who have only entered their monitored service area in the course of a communication.

To prevent the processing device from having to retrieve from the deciphering parameter providing device the current deciphering parameters for mobile radio subscribers that have initiated a communication in the service area of the processing device, each processing device also stores in its memory the first and second deciphering parameters it has determined. To minimize the number of queries to an allocated deciphering parameter providing device, each processing device stores in its memory the first and second deciphering parameters retrieved from the allocated deciphering parameter providing device.

In the process of deciphering data packets, each processing device first checks whether or not the required first and second deciphering parameters may be retrieved from its memory and, only if not, retrieves the parameters from an allocated deciphering parameter providing device. The third deciphering parameter, which may be among others the sequence number of a data packet transferred, may be readily determined by the processing device and need not be retrieved from any other device. The components of the system perform data deciphering and forwarding in real time. The processing devices may be implemented as PowerWan boards, and the deciphering parameter providing device may be a Sun UNIX server.

The following more detailed description uses the example of a GPRS network, but may be adapted to other network standards such as Universal Mobile Telecommunication System (UMTS). Referring now to FIG. 1 all parts of a GPRS mobile radio network are shown where there is a wireless connection between a mobile handset (MRS, Mobile Radio Subscriber) 10 and a BSS 20a. The BSS 20a is coupled to an SGSN 12 via a Gb interface 22a. The SGSN 12 in turn is coupled to an HLR 14 via a Gr interface 24. The SGSN 12 also is coupled to other SGSNs, such as SSGN 16. Via a Gn interface 25 the SGSN 12 also is coupled to a superior Gateway GPRS Service Node (GGSN) 18. By changing position the MRS 10 enters the service area of different BSSs, as indicated by arrows, moving from the service area of BSS 20a into the service area of BSS 20b, and then into the service area of BSS 20c. BSSs 20b and 20c are coupled to SGSN 12 via Gb interfaces 22b, 22c. The connections between SGSN 12 and each BSS 20a-20c are referred to as first links 26a-26c. The connection between the SGSN 12 and the HLR 14 is termed a second link 28.

After switching on the MRS 10 or after a renewed attach, plural ciphering parameters are retrieved from the HLR 14 and part of them are transferred to the MRS 10 via the SGSN 12. For GPRS these are the parameters Kc (ciphering key) and random parameter RAND. Othere parameters involved are obtained from the flow of data on the first link: the IOV (input offset value) that is a random value generated by the SGSN and transferred to the MRS 10; the type of algorithm transferred to the MRS by the SGSN; and the OC (offset counter) that depends on the sequence number of the transferred or received packets—it's an offset different per direction and per transmission type based on the number of LLC (logical link control) window exceeding. Further details may be obtained from GSM 04.64 specification. A further ciphering parameter is determined between the SGSN 12 and MRS 10 from each Logical Link Control (LLC) PDU data, such as the ordering number of each LLC packet or the direction of the packet. These ciphering parameters are used for ciphering the data packets transferred on the first links 26a-26c. Both the first ciphering parameters —provided by the HLR 14—and the second ciphering parameters—recovered from the LLC flow of data—are changed dynamically during the communication.

A deciphering device 30 has three different types of components—one or more processing device(s) 32a-32b, a deciphering server 34 and an application server 36. The different components 32-36 need not all be at the same location, but may be disposed at random sites. For example, different processing devices 32a-32b may be located at the site of different SGSNs 12, 16. Intercommunication between the processing devices 32 and the deciphering and application servers 34, 36, as indicated by arrows, is preferably via LAN or WAN. As indicated by arrow 38 the deciphering server 34 may be connected to deciphering servers of other deciphering devices to have access to deciphering parameters stored there. As indicated by arrow 40 the data of the application server 36 may be provided to a further processing device 42. As many processing devices 32 as are required for connecting to all Gb interfaces 22 as well as all Gr interfaces 24 of the SGSN 12 may be located at the same location as the SGSN.

The components 32-36 are described in more detail with reference to the signal flow graph of FIG. 2. Starting at step 100 a Packet Data Unit (PDU) is input via the Gb or Gr interfaces 22, 24 connected to the processing device 32 and decoded in step 110. In step 120 the PDU also is checked to determine whether ciphering parameters are present. This is possible where the PDU is part of a connection set-up or of a renewed attach. If ciphering parameters are present, the parameters are forwarded as deciphering parameters to the deciphering server 34 in step 125 and stored in memory 44 of the processing device 32. Subsequently in step 130 the deciphering unit 46 associated with the processing device 32 checks whether or not the PDU is ciphered. If the PDU is not ciphered, it is delayed in a delaying device 48 of the processing device 32 in step 140 for combination with deciphered PDUs later on to give an ordered data flow again. If the PDU is found to be ciphered, a keyword is determined in step 150, i.e., the TLLI/RAI information, in order to query the memory 44 in step 160 for deciphering parameters. If deciphering parameters are detected in step 170, they are used in step 180 for deciphering the PDU, such as by means of European Telecommunication Standard Institute (ETSI) deciphering algorithms, if necessary together with further deciphering information such as the PDU sequence number. If the deciphering parameters are not found in memory 44 in step 170, the allocated deciphering server 34 is queried in step 190. In step 200 the deciphering parameters are loaded into the deciphering unit 46 and in step 210 the memory 44 is updated to avoid repeated access to the deciphering server 34. In step 220 the PDUs transferred in an unciphered form and the deciphered PDUs are combined to give a data flow and transferred to the application server 36. Whether further PDUs are present on the inputs of the processing device 32 is checked in step 230. If so, the process returns to step 110, otherwise the process is terminated at step 240.

Additional embodiments and modifications are within the scope of the invention. For example the deciphering parameters in the deciphering server 34 may be deleted once a subscriber has terminated the connection in order to minimize the time spent searching for deciphering parameters of other subscribers.

What is claimed is:

1. A system for communicating monitoring in a mobile radio network comprising:

a processing device coupled to multiple links in the mobile radio network, the processing device (i) determining from data transferred via the multiple links current deciphering parameters and (ii) deciphering the data using the current deciphering parameters to produce deciphered data;

a deciphering parameter providing device coupled to the processing device in which the current deciphering parameters are filed by the processing device to be available for another processing device upon request;

a deciphered data providing device coupled to the processing device for providing the deciphered data at an output for protocol analysis, or procedure trace to be performed on deciphered data;

wherein the processing device, deciphering parameter providing device and deciphered data providing device are distributed over different locations and are coupled together by a communication link;

wherein the data includes both unciphered and ciphered data and the processing device comprises:

means for deciphering the ciphered data according to the current deciphering parameters; and means for combining the unciphered data and the deciphered ciphered data to produce an ordered data flow as the deciphered data;

wherein the combining means comprises a delay device for delaying the unciphered data while the deciphering means deciphers the ciphered data so the deciphered data is in the ordered data flow with the unciphered data.

2. The system as recited in claim 1 wherein the communication link comprises one selected from the group consisting of a local area network and a wide area network.

3. The system as recited in claim 1 wherein the processing means deciphers data on first ones of the multiple links using an additional deciphering parameter extracted from the data, the data being in the form of packet data units, the additional deciphering parameter being a set of parameters obtained from a subscriber data base entity, from the data flow of the connection, and from each packet data unit as the sequence number of the packet data units.

4. The system as recited in claim 1 wherein the processing device comprises a memory coupled to the deciphering parameter providing device for storing deciphering parameters provided by the deciphering parameter providing device.

5. The system as recited in claim 1 wherein the processing device comprises a plurality of processors operating in parallel with the deciphering parameter providing device and deciphered data providing device, the number of processors being sufficient to cover all the multiple links at a serving switching entity.

6. A method of communication monitoring in a mobile radio network comprising the steps of:

determining in a processing device from data transferred via multiple links of the mobile radio network coupled to the processing device current deciphering parameters;

deciphering in the processing device the data usign the current deciphering parameters to produce deciphered data;

filing by the processing device the current deciphering parameters in a deciphering parameter providing device coupled to the processing device so that the current deciphering parameters are available for another processing device upon request;

providing the deciphered data at an output of a deciphered data providing device coupled to the processing device;

performing protocol analysis, or procedure trace on the deciphered data;

wherein the processing device, deciphering parameter providing device and deciphered data providing device are distributed over different locations and are coupled together by a communication link;

wherein the data includes both unciphered and ciphered data and the deciphering step comprises the steps of: deciphering the ciphered data according to the current deciphering parameters; and means for combining the unciphered data and the deciphered ciphered data to produce an ordered data flow as the deciphered data;

wherein the combining step comprises the step of delaying the unciphered data while the deciphering step deciphers the ciphered data so the deciphered data is in the ordered data flow with the unciphered data.

7. The method as recited in claim 6 wherein the communication link comprises one selected from the group consisting of a local area network and a wide area network.

8. The method as recited in claim 6 wherein the deciphering step comprises the step of deciphering data on first ones of the multiple links using an additional deciphering parameter extracted from the data, the data being in the form of packet data units, the additional deciphering parameter being a set of parameters obtained from a subscriber data base entity, from the data flow of the connection, and from each packet data unit as the sequence number of the packet data units.

9. The method as recited in claim 6 wherein the filing step comprises the step of storing deciphering parameters provided by the deciphering parameter providing device in a memory coupled to the deciphering parameter providing device.

10. The method as recited in claim 6 wherein the processing device comprises a plurality of processors operating in parallel with the deciphering parameter providing device and deciphered data providing device, the number of processors being sufficient to cover all the multiple links at a serving switching entity.

* * * * *